(12) United States Patent
Thouin

(10) Patent No.: US 7,072,514 B1
(45) Date of Patent: Jul. 4, 2006

(54) METHOD OF DISTINGUISHING HANDWRITTEN AND MACHINE-PRINTED IMAGES

(75) Inventor: Paul D. Thouin, Eldersburg, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 763 days.

(21) Appl. No.: 10/361,036

(22) Filed: Feb. 6, 2003

(51) Int. Cl.
G06K 9/00 (2006.01)

(52) U.S. Cl. ............ 382/187; 382/176; 382/179; 382/194; 382/224; 715/541

(58) Field of Classification Search ............ 382/170, 382/171, 176, 179, 187, 194, 224; 715/511, 715/541
See application file for complete search history.

(56) References Cited

U.S. PATENT DOCUMENTS

| | | | |
|---|---|---|---|
| 4,910,787 A | | 3/1990 | Umeda et al. |
| 5,181,255 A | * | 1/1993 | Bloomberg ............... 382/176 |
| 5,216,725 A | * | 6/1993 | McCubbrey ............... 382/102 |
| 5,410,614 A | * | 4/1995 | Chou et al. ................ 382/266 |
| 5,442,715 A | | 8/1995 | Gaborski et al. |
| 5,544,259 A | * | 8/1996 | McCubbrey ............... 382/177 |
| 5,561,720 A | * | 10/1996 | Lellmann et al. ........... 382/178 |
| 5,570,435 A | * | 10/1996 | Bloomberg et al. ......... 382/283 |
| 5,862,256 A | * | 1/1999 | Zetts et al. ................ 382/187 |
| 6,259,812 B1 | | 7/2001 | Mao et al. |
| 6,259,814 B1 | | 7/2001 | Krtolica et al. |
| 6,636,631 B1 | * | 10/2003 | Miyazaki et al. ........... 382/187 |
| 6,909,805 B1 | * | 6/2005 | Ma et al. ................... 382/170 |
| 6,920,246 B1 | * | 7/2005 | Kim et al. .................. 382/178 |
| 6,940,617 B1 | * | 9/2005 | Ma et al. ................... 358/1.15 |

OTHER PUBLICATIONS

U. Pal et al., "Automatic Seperation of Machine-Printed and Hand-Written Text Lines," pp.645-648 Proceedings of the 5th International Conference on Document Analysis and Recognition, 1999.

S. Violante et al., "A Computationally Efficient Technique for Discriminating Between Hand-Written and Printed Text," IEE Colloquium on Document Image Processing and Multimedia Environments, 1995.

(Continued)

Primary Examiner—Matthew C. Bella
Assistant Examiner—Gregory Desire
(74) Attorney, Agent, or Firm—Robert D. Morelli

(57) ABSTRACT

The present invention is a method of categorizing an image as handwritten, machine-printed, and unknown. First, the image is received. Next, connected components are identified. Next, a bounding box encloses each connected component. Next, a height and width is computed for each bounding box. Next, a sum and maximum horizontal run for each connected component are computed. Next, connected components that are suspected of being characters are identified. If the number of suspected characters is less than or equal to a first user-definable number then the image is categorized as unknown. If the number of suspected characters is greater than the first user-definable number then determine if matches exist amongst the suspected characters. Next, compute a score based on the suspected characters and the number of matches and categorize the image as either handwritten, machine-printed, or unknown.

9 Claims, 3 Drawing Sheets

OTHER PUBLICATIONS

K. Kuhnke et al., "A System for Machine-Written and Hand-Written Character Distinction," 1995, Proceedings of the 3rd Int. Conf. on Document Analysis and Recognition, pp. 811-814.

Kuo-Chin Fan et al., "Classification of Machine-Printed and Handwritten Texts Using Character Block Layout Variance," pp. 1275-1284 Pattern Recognition, vol. 31, No. 9, 1998.

* cited by examiner

METHOD OF DISTINGUISHING HANDWRITTEN AND MACHINE-PRINTED IMAGES

FIELD OF THE INVENTION

The present invention relates, in general, to image analysis and, in particular, to classifying an image as handwritten, machine-printed, or unknown.

BACKGROUND OF THE INVENTION

Different methodologies are used for performing optical character recognition (OCR) on handwritten text and machine-printed text. To maximize the accuracy of an OCR, it is advisable to separate handwritten text from machine-printed text before having the same processed by an OCR that accepts the text type to be processed.

U. Pal and B. B. Chaudhuri, in an article entitled "Automatic Separation of Machine-Printed and Hand-Written Text Lines," in *Proceedings of the Fifth International Conference on Document Analysis and Recognition*, 1999, pages 645–648, disclose a method of separating machine-printed and handwritten text in both Bangla (Bangla script) and Devnagari (Hindi script) based on the distinctive structural and statistical features of machine-printed and handwritten text lines. The present invention is not based on structural and statistical features of the entire lines of machine-printed and handwritten text.

Sean Violante et al., in an article entitled "A COMPUTATIONALLY EFFICIENT TECHNIQUE FOR DISCRIMINATING BETWEEN HAND-WRITTEN AND PRINTED TEXT," in *IEE Colloquium on Document Image Processing and Multimedia Environments*, 1995, pages 17/1–17/7, disclose a method of distinguishing handwritten versus machine-printed addresses on mail by determining region count, edge straightness, horizontal profile, and the dimensions of the address box and then using a neural network to classify the letter as having either a handwritten or machine-printed address. The present invention does not use all of the features Violante et al. use to determine whether or not text is handwritten or machine-printed.

K. Kuhnke et al., in an article entitled "A System for Machine-Written and Hand-Written Character Distinction," in *Proceedings of the Third International Conference on Document Analysis and Recognition*, 1995, pages 811–814, disclose a method of distinguishing handwritten text from machine-printed text by preprocessing the image by using a bounding box and extracting contours, extracting features from the image (i.e., straightness of vertical lines, straightness of horizontal lines, and symmetry relative to the center of gravity of the character in question). The features extracted by Kuhnke et al. are not used in the present invention.

Kuo-Chin Fan et al., in an article entitled "CLASSIFICATION OF MACHINE-PRINTED AND HANDWRITTEN TEXTS USING CHARACTER BLOCK LAYOUT VARIANCE," in *Pattern Recognition*, 1998, Vol. 31, No. 9, pages 1275–1284, disclose a method of distinguishing handwritten text from machine-printed text by dividing text blocks into horizontal or vertical directions, obtaining the base blocks from a text block image using a reduced X-Y cut algorithm, determining character block layout variance, and classifying the text according to the variance. The variance determined by Fan et al. is not used in the present invention.

U.S. Pat. No. 4,910,787, entitled "DISCRIMINATOR BETWEEN HANDWRITTEN AND MACHINE-PRINTED CHARACTERS," discloses a device for and method of distinguishing between handwritten and machine-printed text by determining the total number of horizontal, vertical, and slanted strokes in the text, determining the ratio of slanted strokes to the determined total, and declaring the text handwritten if the ratio is above 0.2 and machine-printed if the ratio is below 0.2. The present invention does not distinguish between handwritten and machine-printed text based on a ratio of slanted strokes in the text to a total of horizontal, vertical, and slanted strokes in the text. U.S. Pat. No. 4,910,787 is hereby incorporated by reference into the specification of the present invention.

U.S. Pat. No. 5,442,715, entitled "METHOD AND APPARATUS FOR CURSIVE SCRIPT RECOGNITION," discloses a device for and method of recognizing cursive script by segmenting words into individual characters, scanning the individual characters using a window, and determining whether or not a character within the window is in a cursive script using a neural network. The present invention does not use a scanning window or a neural network to distinguish between handwritten and machine-printed text. U.S. Pat. No. 5,442,715 is hereby incorporated by reference into the specification of the present invention.

U.S. Pat. No. 6,259,812, entitled "KEY CHARACTER EXTRACTION AND LEXICON REDUCTION CURSIVE TEXT RECOGNITION," discloses a device for and method of recognizing cursive text by calculating character and geometric confidence levels to identify "key characters." The present invention does not calculate character and geometric confidence levels to identify "key characters." U.S. Pat. No. 6,259,812 is hereby incorporated by reference into the specification of the present invention.

U.S. Pat. No. 6,259,814, entitled "IMAGE RECOGNITION THROUGH LOCALIZED INTERPRETATION," discloses a device for and method of recognizing machine-printed and handwritten characters images by creating a look-up table with examples of machine-printed and handwritten characters and comparing an unknown character to the look-up table to determine its type. The present invention does not use a look-up table filled with examples of machine-printed and handwritten characters. U.S. Pat. No. 6,259,814 is hereby incorporated by reference into the specification of the present invention.

SUMMARY OF THE INVENTION

It is an object of the present invention to categorize an image as handwritten, machine-printed, or unknown.

The present invention is a method of categorizing an image as either handwritten, machine-printed, or unknown.

The first step of the method is receiving an image.

The second step of the method is identifying connected components within the image.

The third step of the method is enclosing each connected component within a rectangular, or bounding, box.

The fourth step of the method is computing a height and a width of each bounding box.

The fifth step of the method is computing a sum and maximum horizontal run for each connected component, where the sum is the sum of all pixels in the corresponding connected component, and where the maximum horizontal run is the longest consecutive number of horizontal pixels in the corresponding connected component.

The sixth step of the method is identifying connected components that are suspected of being characters.

If the number of suspected characters is less than or equal to a first user-definable number then the seventh step of the method is categorizing the image as unknown and stopping. Otherwise, proceed to the next step.

If the number of suspected characters is greater than the first user-definable number then the eighth step of the method is comparing the suspected characters to determine if matches exist.

The ninth step of the method is computing a score based on the suspected characters and the number of matches and categorizing the image into one of a group of categories consisting of handwritten, machine-printed, and unknown.

DETAILED DESCRIPTION

The present invention is a method of categorizing an image as handwritten, machine-printed, or unknown.

Figure 1:
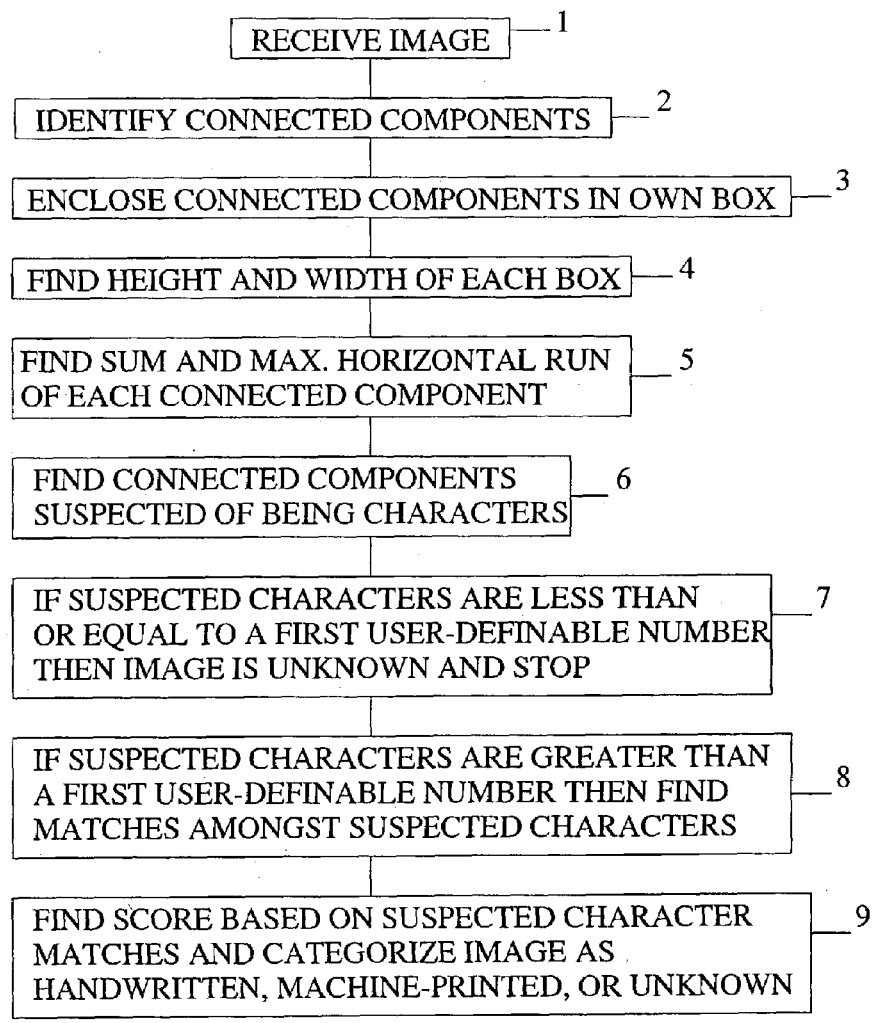
FIG. 1 is a list of steps of the present invention.

FIG. 1 is a list of steps of the present method.

The first step 1 of the method is receiving an image.

The second step 2 of the method is identifying connected components within the image. A connected component is a grouping of black pixels, where each pixel touches at least one other pixel within the connected component. For example, the lower case "i" contains two connected components, the letter without the dot and the dot.

The third step 3 of the method is enclosing each connected component within a rectangular, or bounding, box.

The fourth step 4 of the method is computing a height and a width of each bounding box.

The fifth step 5 of the method is computing a sum and maximum horizontal run for each connected component, where the sum is the sum of all pixels in the corresponding connected component, and where the maximum horizontal run is the longest consecutive number of horizontal pixels in the corresponding connected component.

The sixth step 6 of the method is identifying connected components that are suspected of being characters. The details of the sixth step 6 are listed in FIG. 2 and described below.

If the number of suspected characters is less than or equal to a first user-definable number then the seventh step 7 of the method of FIG. 1 is categorizing the image as unknown and stopping. Otherwise, proceed to the next step. In the preferred embodiment, the first user-definable number is 30.

If the number of suspected characters is greater than the first user-definable number then the eighth step 8 of the method is comparing the suspected characters to determine if matches exist. Each suspected character is compared against every other suspected character. A match exists between a pair of suspected characters if they have the same height and width, if each suspected character in the pair has a height that is less than 4 times its width, and if each suspected character in the pair has a width that is less than 4 times its height. If there are a significant number of matches then the image likely contains machine-printed characters.

The ninth step 9 of the method is computing a score based on the suspected characters and the number of matches and categorizing the image into one of a group of categories consisting of handwritten, machine-printed, and unknown. The details of the ninth step 9 are listed in FIG. 3 and described below.

Figure 2:
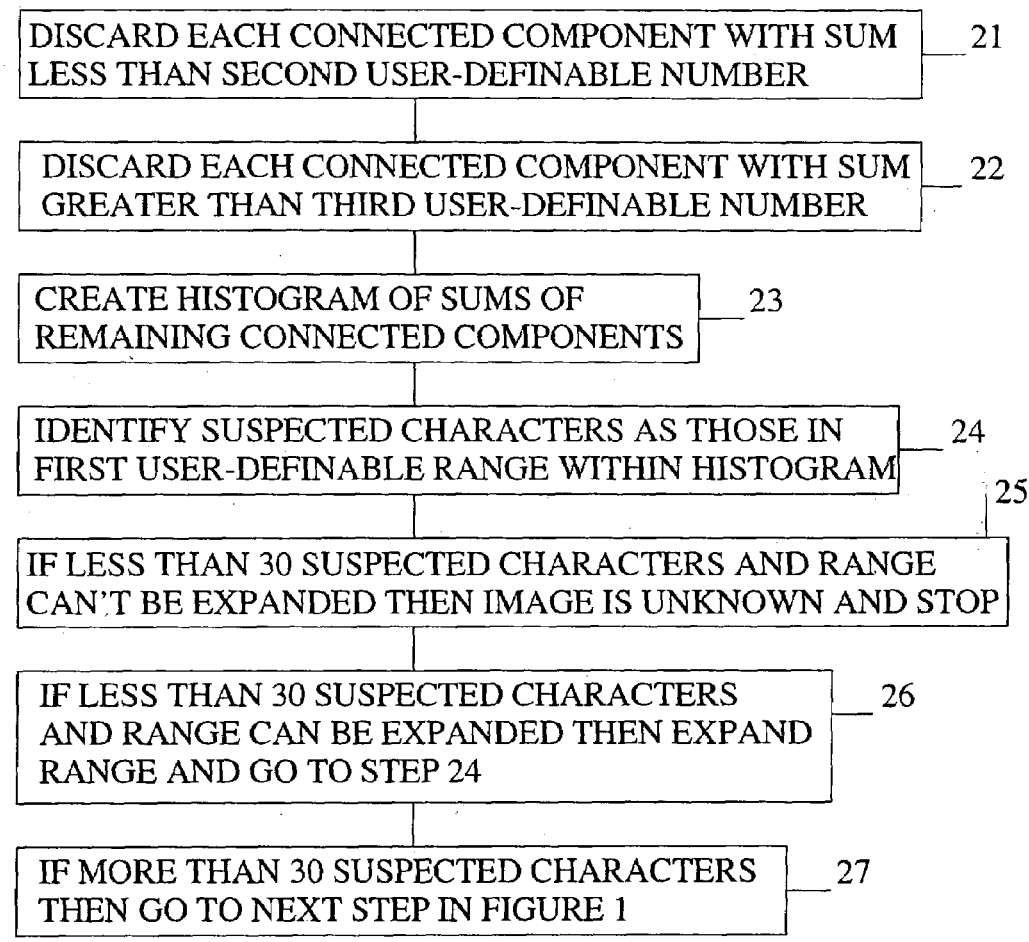
FIG. 2 is a list of steps for selecting components that are suspected characters.

FIG. 2 is a list of steps for achieving the sixth step 6 in FIG. 1, which is identifying connected components within the image that are suspected of being characters. The first step 21 of the method of FIG. 2 is discarding each connected component that has a sum less than a second user-definable number. In the preferred embodiment, the second user-definable number is 50. A connected component that has a sum less than 50 is unlikely to include a textual character.

The second step 22 of the method of FIG. 2 is discarding each connected component that has a sum greater than a third user-definable number. In the preferred embodiment, the third user-definable number is 5000. A connected component that has a sum greater than 5000 is unlikely to include a textual character.

The third step 23 of the method of FIG. 2 is creating a histogram of the sums of the connected components that were not discarded.

The fourth step 24 of the method of FIG. 2 is identifying as suspected characters the connected components within a first user-definable range within the histogram. In the preferred embodiment, the first user-definable range within the histogram is from the $65^{th}$ percentile to the $75^{th}$ percentile.

If there are less than 30 suspected characters and the first user-definable range cannot be expanded then the fifth step 25 of the method of FIG. 2 is categorizing the image as unknown and stopping. Otherwise, proceed to the next step. The first user-definable range cannot be expanded if either the first user-definable range is from the $0^{th}$ percentile to the $100^{th}$ percentile or is a second user-definable range (e.g., from the $10^{th}$ percentile to the $80^{th}$ percentile).

If there are less than 30 suspected characters and the first user-definable range can be expanded then the sixth step 26 of the method of FIG. 2 is expanding the first user-definable range and returning to the fourth step 24. In the preferred embodiment, the present first user-definable range is expanded by 10 percentiles, with the upper percentile being no higher than 80. For example, a first range expansion in the preferred embodiment would be from the $65^{th}$–$75^{th}$ percentiles to the $60^{th}$–$80^{th}$ percentiles, a second range expansion in the preferred embodiment would be from the $60^{th}$–$80^{th}$ percentiles to the $50^{th}$–$80^{th}$ percentiles.

If there are more than 30 suspected characters identified then the seventh, and last, step 27 in the method of FIG. 2 is proceeding to the next step in the method of FIG. 1.

Figure 3:
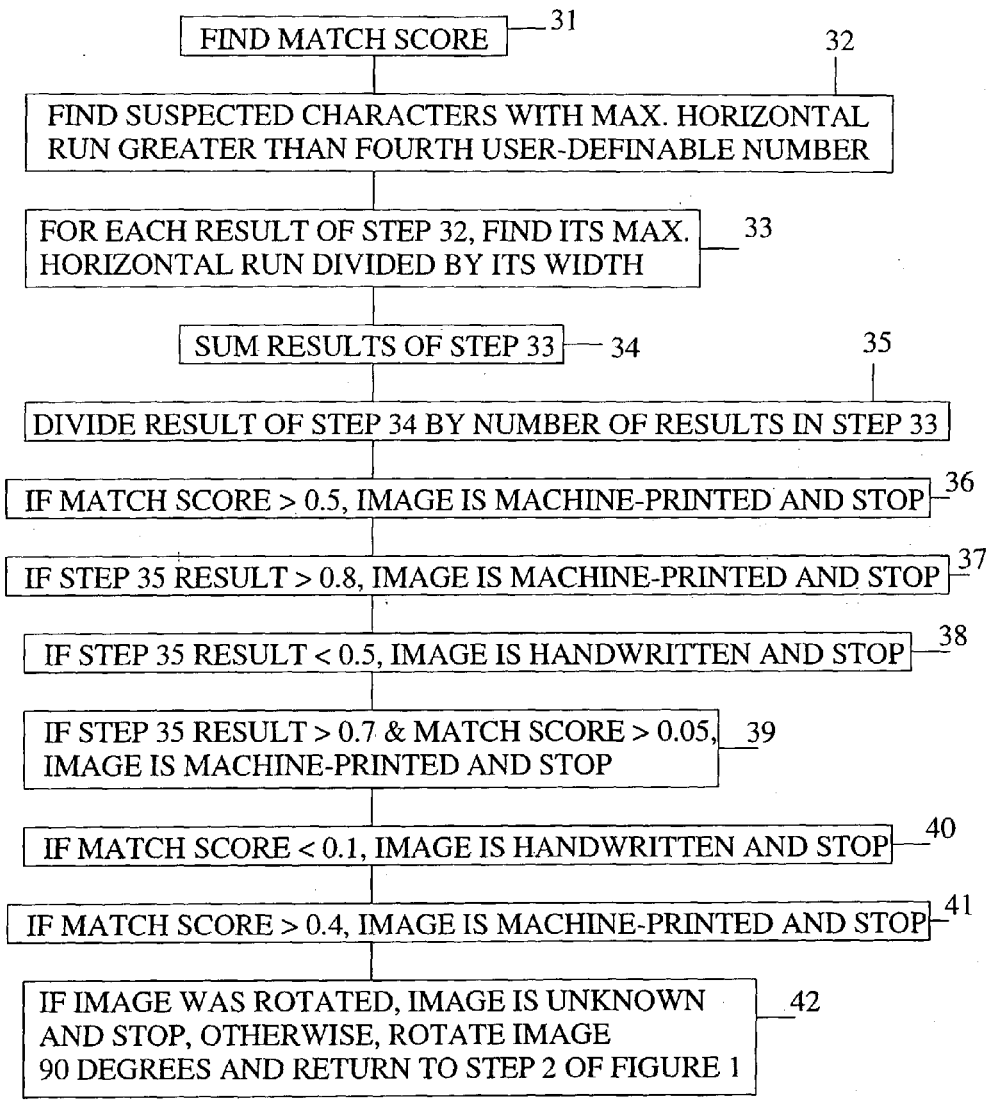
FIG. 3 is a list of steps for computing a match score and maximum run ratio.

FIG. 3 is a list of steps for achieving the ninth step 9 in FIG. 1, which is computing a score based on the suspected characters and the number of matches and categorizing the image into one of a group of categories consisting of handwritten, machine-printed, and unknown.

The first step 31 of the method of FIG. 3 is computing a match score, where the match score is the number of suspected characters that match at least one other suspected character divided by the total number of suspected characters.

The second step 32 of the method of FIG. 3 is identifying each suspected character having a maximum horizontal run greater than a fourth user-definable number. In the preferred embodiment, the fourth user-definable number is 10.

The third step 33 of the method of FIG. 3 is computing, for each suspected character identified in the second step 32, a ratio of the maximum horizontal run of the suspected character divided by the width of the suspected character.

The fourth step 34 of the method of FIG. 3 is summing the ratios resulting from the third step 33.

The fifth step 35 of the method of FIG. 3 is forming a maximum run ratio as the result of the fourth step 34 divided by the total number of ratios computed in the third step 33.

If the match score is greater than 0.5 then the sixth step 36 of the method of FIG. 3 is categorizing the image as machine-printed and stopping. Otherwise, proceed to the next step.

If the maximum run ratio is greater than 0.8 then the seventh step 37 of the method of FIG. 3 is categorizing the image as machine-printed and stopping. Otherwise, proceed to the next step.

If the maximum run ratio is less than 0.5 then the eighth step 38 of the method of FIG. 3 is categorizing the image as handwritten and stopping. Otherwise, proceed to the next step.

If the maximum run ratio is greater than 0.7 and the match score is greater than 0.05 then the ninth step 39 of the method of FIG. 3 is categorizing the image as machine-printed and stopping. Otherwise, proceed to the next step.

If the match score is less than 0.1 then the tenth step 40 of the method of FIG. 3 is categorizing the image as handwritten and stopping. Otherwise, proceed to the next step.

If the match score is greater than 0.4 then the eleventh step 41 of the method of FIG. 3 is categorizing the image as machine-printed and stopping. Otherwise, proceed to the next step.

If the image has been rotated then the twelfth step 42 of the method of FIG. 3 is categorizing the image as unknown and stopping. Otherwise, rotate the image 90 degrees and return to the second step 2 of the method of FIG. 1.

What is claimed is:

1. A method of categorizing an image as handwritten, machine-printed, and unknown,
comprising the steps of:
    (a) receiving an image;
    (b) identifying connected components within the image;
    (c) enclosing each connected component within a bounding box;
    (d) computing a height and a width of each bounding box;
    (e) computing a sum and maximum horizontal run for each connected component, where the sum is the sum of all pixels in the corresponding connected component, and where the maximum horizontal run is the longest consecutive number of horizontal pixels in the corresponding connected component;
    (f) identifying connected components that are suspected of being characters;
    (g) if the number of suspected characters is less than or equal to a first user-definable number then categorizing the image as unknown and stopping, otherwise, proceeding to the next step;
    (h) if the number of suspected characters is greater than the first user-definable number then comparing the suspected characters to determine if matches exist, where a match exists between a pair of suspected characters if the suspected characters in the pair have the same height and width, if each suspected character in the pair has a height that is less than 4 times its width, and if each suspected character in the pair has a width that is less than 4 times its height; and
    (i) computing a score based on the suspected characters and the number of matches and categorizing the image into one of a group of categories consisting of handwritten, machine-printed, and unknown.

2. The method of claim 1, wherein the first user-definable number is 30.

3. The method of claim 1, wherein the step of identifying connected components that are suspected of being characters is comprised of the steps of:
    (a) discarding each connected component that has a sum less than a second user-definable number;
    (b) discarding each connected component that has a sum greater than a third user-definable number;
    (c) creating a histogram of the sums of the connected components that were not discarded;
    (d) identifying as suspected characters the connected components within a first user-definable range within the histogram;
    (e) if there are less than 30 suspected characters and the first user-definable range cannot be expanded then categorizing the image as unknown and stopping, otherwise proceeding to the next step;
    (f) if there are less than 30 suspected characters and the first user-definable range can be expanded then expanding the first user-definable range and returning to the fourth step, otherwise, proceeding to the next step; and
    (g) if there are more than 30 suspected characters identified then proceeding to step (h) in claim 1.

4. The method of claim 3, wherein the second user-definable number is 50.

5. The method of claim 3, wherein the third user-definable number is 5000.

6. The method of claim 3, wherein the first user-definable range within the histogram is from a $65^{th}$ percentile to a $75^{th}$ percentile.

7. The method of claim 3, wherein the first user-definable range is expanded by 10 percentiles.

8. The method of claim 1, wherein the step of computing a score based on the suspected characters and the number of matches and categorizing the image into one of a group of categories consisting of handwritten, machine-printed, and unknown is comprised of the steps of:
    (a) computing a match score, where the match score is the number of suspected characters that match at least one other suspected character divided by the total number of suspected characters;
    (b) identifying each suspected character having a maximum horizontal run greater than a fourth user-definable number;
    (c) computing, for each suspected character identified in step (b), a ratio of the maximum horizontal run of the suspected character divided by the width of the suspected character;
    (d) summing the ratios resulting from step (c);
    (e) forming a maximum run ratio as the result of step (d) divided by the total number of ratios computed in step (c);
    (f) if the match score is greater than 0.5 then categorizing the image as machine-printed and stopping, otherwise, proceeding to the next step;
    (g) if the maximum run ratio is greater than 0.8 then categorizing the image as machine-printed and stopping, otherwise, proceeding to the next step;
    (h) if the maximum run ratio is less than 0.5 then categorizing the image as handwritten and stopping, otherwise, proceeding to the next step;
    (i) if the maximum run ratio is greater than 0.7 and the match score is greater than 0.05 then categorizing the image as machine-printed and stopping, otherwise, proceeding to the next step;
    (j) if the match score is less than 0.1 then categorizing the image as handwritten and stopping, otherwise, proceeding to the next step;

(k) if the match score is greater than 0.4 then categorizing the image as machine-printed and stopping, otherwise, proceeding to the next step; and (l) if the image has been rotated then categorizing the image as unknown and stopping, otherwise, rotating the image 90 degrees and returning to step (b) in claim 1.

9. The method of claim 8, wherein the fourth user-definable number is 10.

\* \* \* \* \*